US011879822B2

(12) United States Patent
Akiyama et al.

(10) Patent No.: US 11,879,822 B2
(45) Date of Patent: Jan. 23, 2024

(54) PARTICLE SIZE DISTRIBUTION MEASURING DEVICE AND PROGRAM FOR PARTICLE SIZE DISTRIBUTION MEASURING DEVICE

(71) Applicant: HORIBA, Ltd., Kyoto (JP)

(72) Inventors: Hisashi Akiyama, Kyoto (JP); Tetsuya Mori, Kyoto (JP); Eiichi Nagaoka, Kyoto (JP)

(73) Assignee: HORIBA, LTD., Kyoto (JP)

( * ) Notice: Subject to any disclaimer, the term of this patent is extended or adjusted under 35 U.S.C. 154(b) by 41 days.

(21) Appl. No.: 17/059,117

(22) PCT Filed: May 27, 2019

(86) PCT No.: PCT/JP2019/020835
§ 371 (c)(1),
(2) Date: Nov. 25, 2020

(87) PCT Pub. No.: WO2019/230628
PCT Pub. Date: Dec. 5, 2019

(65) Prior Publication Data
US 2021/0208048 A1    Jul. 8, 2021

(30) Foreign Application Priority Data

Jun. 1, 2018   (JP) .................................. 2018-106011

(51) Int. Cl.
*G01N 15/02* (2006.01)
*G06T 5/50* (2006.01)
(Continued)

(52) U.S. Cl.
CPC ..... *G01N 15/0227* (2013.01); *G01N 15/0211* (2013.01); *G06T 5/50* (2013.01);
(Continued)

(58) Field of Classification Search
CPC ..... G01N 2015/025; G01N 2015/0211; G01N 2015/0227; G01N 2015/1463; H04N 13/106; G06T 5/50
See application file for complete search history.

(56) References Cited

U.S. PATENT DOCUMENTS 9,897,525 B2 *   2/2018   Spriggs .................. G01N 21/47
10,591,422 B2 *  3/2020   Fan ......................... G01N 15/06
(Continued)

FOREIGN PATENT DOCUMENTS

JP    2009-031191 A    2/2009
JP    2010-223613 A    10/2010
(Continued)

OTHER PUBLICATIONS

PCT, International Search Report for the corresponding patent application No. PCT/JP2019/020835, dated Jul. 23, 2019, with English translation.
(Continued)

*Primary Examiner* — Rebecca C Bryant
(74) *Attorney, Agent, or Firm* — LUCAS & MERCANTI, LLP

(57) ABSTRACT

To enable the particle size distribution of a measurement target to be accurately measured regardless of the presence of a particle which is similar in shape to the measurement target and which is not the measurement target, a particle size distribution measuring device includes an image processing unit that receives image data obtained by capturing an image of a particle group including a first particle and a second particle of a type different from the first particle, at least the first particle being translucent; and a particle discriminating unit that discriminates whether a particle depicted in the image is the first particle or the second particle on the basis of light and dark regions that appear as a result of refraction of light passing through the particle.

11 Claims, 8 Drawing Sheets

(51) Int. Cl.
*G06V 10/141* (2022.01)
*G06V 10/56* (2022.01)
*G06V 10/764* (2022.01)
*G06V 10/143* (2022.01)
*G06V 10/20* (2022.01)

(52) U.S. Cl.
CPC .......... *G06V 10/141* (2022.01); *G06V 10/143* (2022.01); *G06V 10/255* (2022.01); *G06V 10/56* (2022.01); *G06V 10/764* (2022.01); *G01N 2015/0222* (2013.01)

(56) References Cited

U.S. PATENT DOCUMENTS

| | | | |
|---|---|---|---|
| 11,112,342 B2* | 9/2021 | Corbett | G01N 15/1456 |
| 11,131,627 B2* | 9/2021 | Bachalo | G01N 15/0227 |
| 2011/0157351 A1 | 6/2011 | Pollack | |
| 2011/0170659 A1* | 7/2011 | Ohzu | G01N 23/223 378/50 |
| 2018/0120214 A1 | 5/2018 | Kato et al. | |

FOREIGN PATENT DOCUMENTS

| | | |
|---|---|---|
| JP | 2012-068802 A | 4/2012 |
| JP | 2014-503794 A | 2/2014 |
| JP | 2014-163771 A | 9/2014 |
| JP | 2016-048185 A | 4/2016 |
| JP | 2018-004450 A | 1/2018 |
| WO | 2012/062805 A1 | 5/2012 |
| WO | 2017/048960 A1 | 3/2017 |

OTHER PUBLICATIONS

EPO, Extended European Search Report issued in European patent application No. 19811925.7, dated Jan. 4, 2022.

* cited by examiner

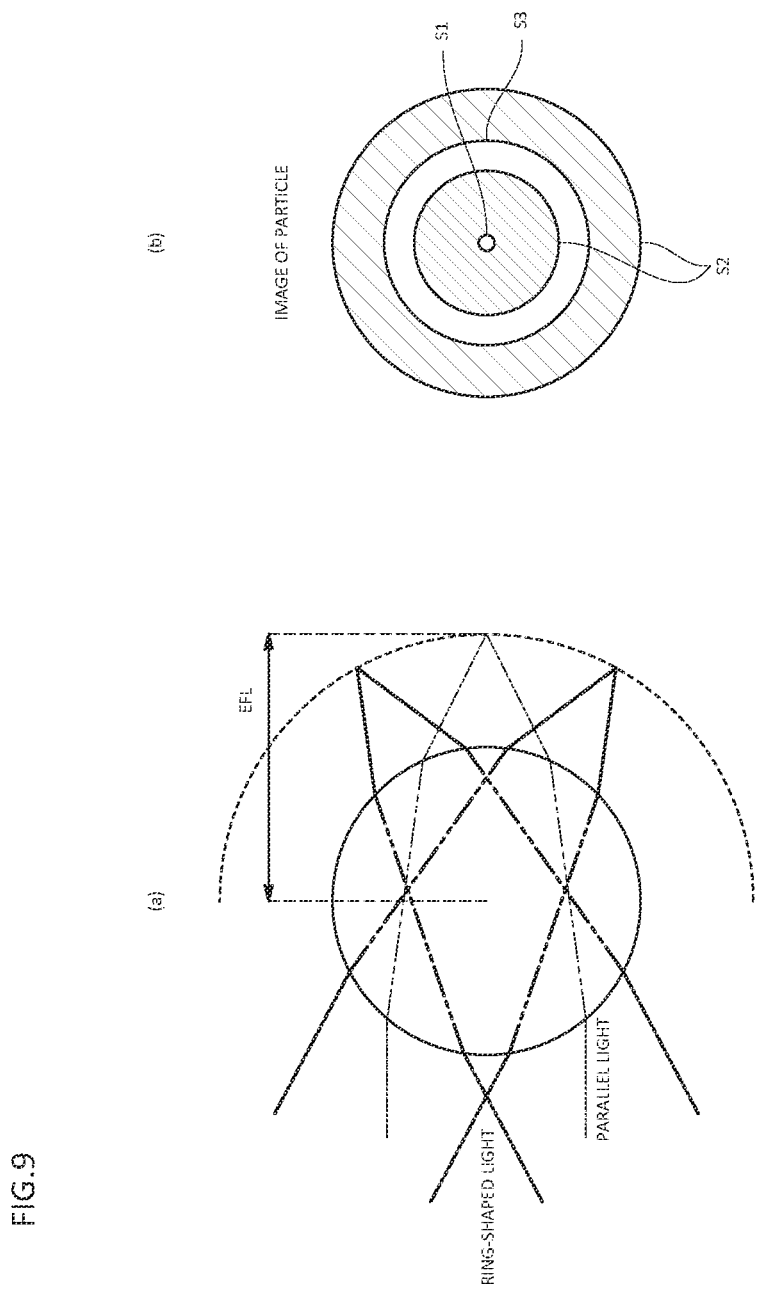

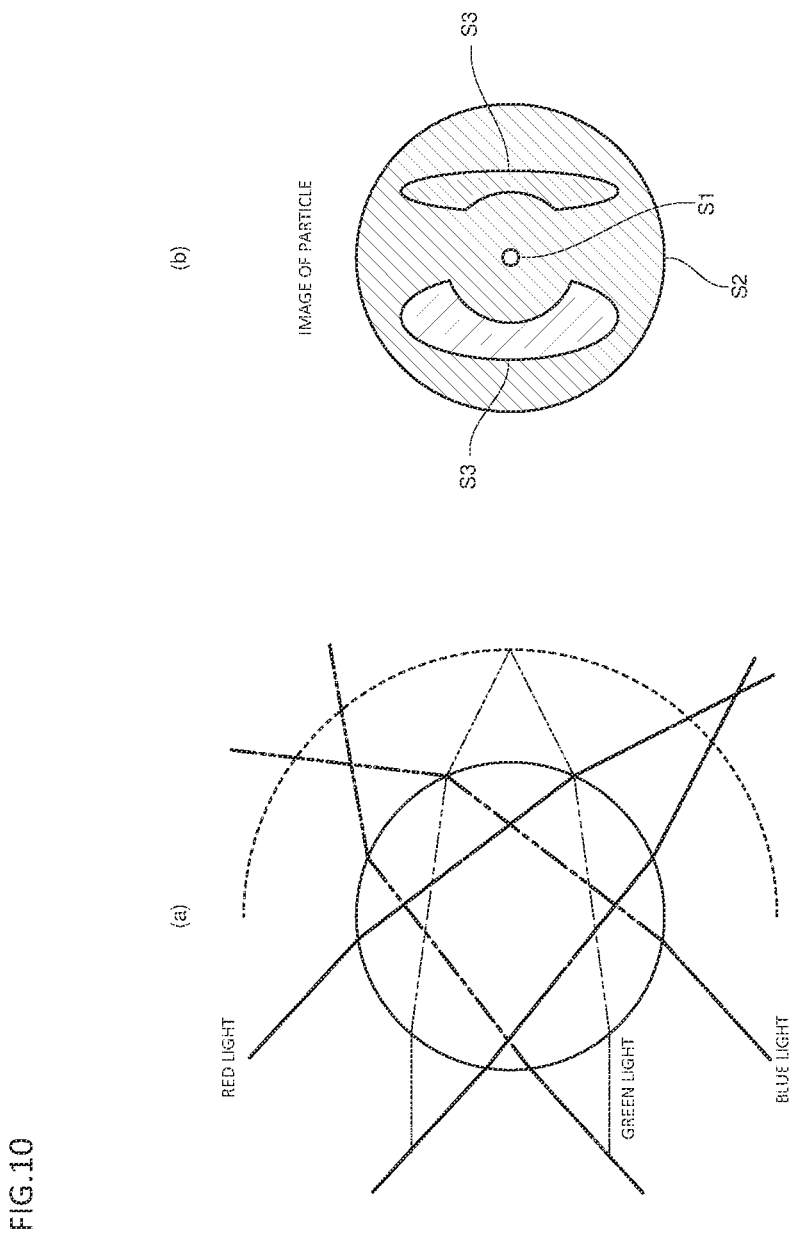

PARTICLE SIZE DISTRIBUTION MEASURING DEVICE AND PROGRAM FOR PARTICLE SIZE DISTRIBUTION MEASURING DEVICE

CROSS REFERENCE TO RELATED APPLICATION

This Application is a 371 of PCT/JP2019/020835 filed on May 27, 2019 which, in turn, claimed the priority of Japanese Patent Application No. 2018-106011 filed on Jun. 1, 2018, both applications are incorporated herein by reference.

TECHNICAL FIELD

The present invention relates to a particle size distribution measuring device and a program used for the particle size distribution measuring device.

BACKGROUND ART

There is a light-scattering particle size distribution measuring device that irradiates with light a particle group which is a measurement target dispersed in a medium and that calculates the particle size distribution of the measurement target on the basis of the light intensity spectrum of diffracted/scattered light resulting therefrom, as disclosed in PTL 1.

In such a particle size distribution measuring device, if particles different from the measurement target enter the medium, the particle size distribution of a particle group including particles which are the measurement target and particles which are not the measurement target is calculated, and a measurement error occurs.

Accordingly, the particle size distribution measuring device described in PTL 1 is configured to discriminate whether or not a particle is a measurement target by performing image processing on a captured image of a particle group by using a difference in shape (whether spherical or not) between a fine bubble as the measurement target and a contaminant (foreign substance), and calculate the particle size distribution of particles discriminated as the measurement target.

However, in the above-described configuration, when a particle which is the measurement target and a particle which is not the measurement target are similar in shape, it is not possible to discriminate the particles captured in an image and to accurately measure the particle size distribution of the measurement target.

CITATION LIST

Patent Literature

PTL 1: Japanese Unexamined Patent Application Publication No. 2018-4450

SUMMARY OF INVENTION

Technical Problem

Accordingly, the present invention has been made to solve the above-described problem and a main object thereof is to enable the particle size distribution of a measurement target to be accurately measured regardless of the presence of a particle which is similar in shape to the measurement target and which is not the measurement target.

Solution to Problem

A particle size distribution measuring device according to the present invention includes an image processing unit that receives image data obtained by capturing an image of a particle group including a first particle and a second particle of a type different from the first particle, at least the first particle being translucent; and a particle discriminating unit that discriminates whether a particle depicted in the image is the first particle or the second particle on the basis of light and dark regions that appear as a result of refraction of light passing through the particle.

In the particle size distribution measuring device having this configuration, in a case where the second particle is a particle which does not allow light to pass therethrough, for example, the second particle depicted in an image does not have light and dark regions, and thus the particle discriminating unit is capable of discriminating whether a particle depicted in an image is the first particle or the second particle on the basis of the presence or absence of the light and dark regions. Thus, whether or not the particle depicted in the image is a measurement target can be discriminated and the particle size distribution of the measurement target can be accurately measured regardless of the presence of a particle which is similar in shape to the measurement target and which is not the measurement target.

On the other hand, in a case where the second particle is translucent, both the first particle and the second particle depicted in an image have light and dark regions, and thus it is difficult to discriminate a particle depicted in an image only by the presence or absence of light and dark regions.

Accordingly, it is preferable that, in a case where the second particle is translucent, the particle discriminating unit discriminate whether the particle depicted in the image is the first particle or the second particle on the basis of an image difference in the light and dark regions, the image difference arising from a difference between a refractive index of the first particle and a refractive index of the second particle.

With this configuration, even in a case where both a particle which is the measurement target and a particle which is not the measurement target are translucent, whether the particle depicted in the image is the measurement target is discriminated on the basis of an image difference in the light and dark regions, the image difference arising from the difference between these refractive indices, and thus it is possible to accurately measure the particle size distribution of the measurement target.

Here, an example of the case where a measurement error occurs described in Background Art is a case where a medium in which the measurement target disperses includes bubbles. That is, an effect of the present invention is enhanced more remarkably in a case where the first particle is a measurement target and the second particle is a bubble.

Specifically, use of the above-described particle size distribution measuring device makes it possible to discriminate whether a particle depicted in an image is a bubble or the measurement target. Thus, for example, as a result of calculating the particle size distribution of particles discriminated as bubbles and subtracting an influence of the particle size distribution from the particle size distribution of a particle group including the bubbles and particles as the measurement target, it is possible to reduce a measurement error caused by bubbles and to accurately measure the particle size distribution of the measurement target.

Preferably, the particle size distribution measuring device includes an overall particle size distribution calculating unit that calculates an overall particle size distribution which is a particle size distribution of the particle group; a bubble size distribution calculating unit that calculates a bubble size distribution which is a particle size distribution of bubbles on the basis of the image data received by the image processing unit and a result of discrimination performed by the particle discriminating unit; and a target particle size distribution calculating unit that subtracts an influence of the bubble size distribution from the overall particle size distribution to calculate a target particle size distribution which is a particle size distribution of the measurement target.

With this configuration, an influence of the particle size distribution of bubble is subtracted from the particle size distribution of the overall particle group to calculate the particle size distribution of the measurement target, and thus the particle size distribution of the measurement target can be accurately calculated.

Preferably, the overall particle size distribution calculating unit calculates the overall particle size distribution on the basis of a light intensity spectrum of diffracted/scattered light generated by irradiating the particle group with light.

Accordingly, the particle size distribution of smaller particles can be measured compared to the case of performing measurement using, for example, an image-based measurement method, and a measurable particle size range can be expanded.

According to a specific embodiment for discriminating a particle by using the above-described image difference in the light and dark regions, the particle size distribution measuring device may include a light irradiating device that irradiates the particle group with light; and an image capturing device that captures an image of a particle, the light and dark regions being identifiable in the image. The particle discriminating unit may discriminate whether the particle depicted in the image captured by the image capturing device is a bubble or the measurement target by using, as the image difference, at least one of a ratio, a size, a shape, a disposition, or a brightness of a light region of the light and dark regions or at least one of a ratio, a size, a shape, a disposition, or a brightness of a dark region of the light and dark regions.

In the case of discriminating a particle by using the image difference in the light and dark regions, when the particle is located out of focus of the image capturing device and the light and dark regions blur, for example, it is difficult to discriminate whether the particle is a bubble or the measurement target. In this case, the number of particles that can be discriminated between a bubble and the measurement target decreases. Thus, it is not possible to accurately calculate the particle size distribution of bubbles included in the particle group, and thus it is not possible to accurately measure the particle size distribution of the measurement target.

Accordingly, it is preferable that the image capturing device include an image capturing lens, a first light receiving element that receives light in a first wavelength range of light focused by the image capturing lens, a second light receiving element that receives light in a second wavelength range of the light focused by the image capturing lens, and an optical element that expands an axial chromatic aberration between an image formation system of the first wavelength range and an image formation system of the second wavelength range.

With this configuration, the axial chromatic aberration between the image formation system of the first wavelength range and the image formation system of the second wavelength range is expanded by the optical element, and thus the focal length of the image capturing lens differs between light in the first wavelength range and light in the second wavelength range. As a result of receiving these light beams by the first light receiving element and the second light receiving element, particles at positions different in the optical axis direction of the image capturing lens can be measured. In other words, more particles can be focused on and more particles can be discriminated between a bubble and the measurement target. As a result, the particle size distribution of bubbles included in the particle group can be accurately calculated, and thus the particle size distribution of the measurement target can be accurately measured.

In addition, when one particle depicted in an image is focused on, as a result of comparing light and dark regions of an image obtained by receiving light having a first wavelength by the first light receiving element with light and dark regions of an image obtained by receiving light having a second wavelength by the second light receiving element, it is possible to discriminate the particle on the basis of the difference.

According to another embodiment for increasing the number of particles that can be discriminated between a bubble and the measurement target, the light irradiating device may be configured to irradiate the particle group with parallel light and irradiate the particle group with slanting light having an optical axis slanting with respect to an optical axis of the parallel light, and the particle discriminating unit may discriminate whether the particle depicted in the image captured by the image capturing device is a bubble or the measurement target by using, as the image difference, at least one of a ratio, a size, a shape, a disposition, or a brightness of a light region of light and dark regions that appear as a result of refraction of the slanting light passing through the particle or at least one of a ratio, a size, a shape, a disposition, or a brightness of a dark region of the light and dark regions.

With this configuration, the light region of the light and dark regions that appear as a result of refraction of the slanting light is a relatively large region. Thus, even when the particle is located out of focus of the image capturing device and the light and dark regions resulting from the slanting light blur to some extent, for example, the particle can be discriminated by using the light and dark regions, and more particles can be discriminated between a bubble and the measurement target.

According to an embodiment for making the light region of the light and dark regions larger, it is preferable that the slanting light be ring-shaped light.

It is preferable that the light irradiating device be configured to irradiate the particle group with a plurality of slanting light beams having colors different from each other from directions different from each other.

With this configuration, the plurality of slanting light beams are radiated, and thus an image of light and dark regions the number of which is the same as the number of slanting light beams can be captured. Thus, more parameters such as the ratio, size, shape, and disposition of the light region or the dark region of these light and dark regions can be used as an image difference, and whether the particle is the measurement target or a bubble can be discriminated more correctly. In addition, because the individual slanting light beams have colors different from each other, the ratio, size, shape, disposition, or the like of the light and dark regions for each slanting light beam can be correctly identified.

A program for a particle size distribution measuring device according to the present invention is a program causing a computer to execute functions of an image processing unit that receives image data obtained by capturing an image of a particle group including a first particle and a second particle of a type different from the first particle, at least the first particle being translucent; and a particle discriminating unit that discriminates whether a particle depicted in the image is the first particle or the second particle on the basis of light and dark regions that appear as a result of refraction of light passing through the particle.

With use of such a program, a function and an effect similar to those of the above-described particle size distribution measuring device can be obtained.

Advantageous Effects of Invention

According to the above-described present invention, it is possible to discriminate whether or not a particle captured in an image is a measurement target and to accurately measure the particle size distribution of the measurement target regardless of the presence of a particle which is similar in shape to the measurement target and which is not the measurement target.

BRIEF DESCRIPTION OF DRAWINGS

FIG. 9 includes diagrams for describing an irradiation method of light from a light irradiating device according to another embodiment.

FIG. 10 includes diagrams for describing an irradiation method of light from the light irradiating device according to another embodiment.

DESCRIPTION OF EMBODIMENTS

Hereinafter, a particle size distribution measuring device according to an embodiment of the present invention will be described with reference to the drawings.

Figure 1:
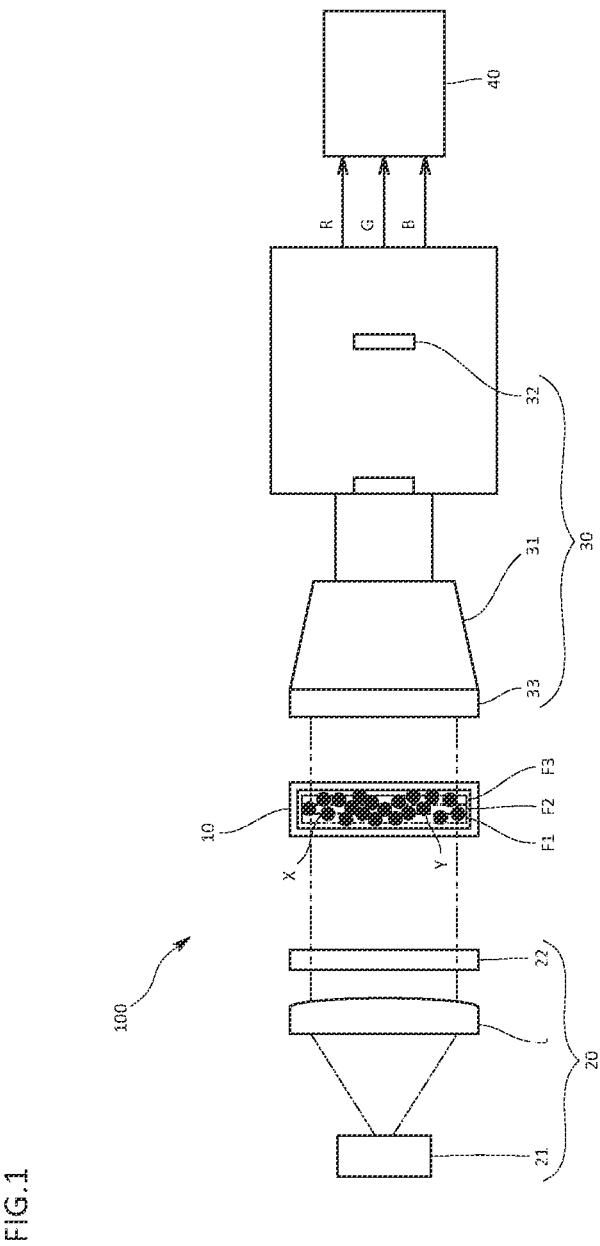
FIG. 1 is a diagram schematically illustrating an overall configuration of a particle size distribution measuring device according to a present embodiment.

As illustrated in FIG. 1, a particle size distribution measuring device 100 according to the present embodiment includes an image-based measuring mechanism that measures a particle size distribution by using an image analysis method, and specifically includes a cell 10 that accommodates a particle group which is a measurement target X, a light irradiating device 20 that irradiates the particle group in the cell 10 with light, an image capturing device 30 that captures an image of the particle group accommodated in the cell 10, and an image analyzing device 40 that analyzes image data obtained by the image capturing device 30.

Here, the cell 10 accommodates first particles X which are translucent and second particles Y of a type different from the first particles X. The translucent particles as the first particles X may be, for example, bubbles or resin particles, and the second particles Y may be particles which are translucent or particles which are not translucent. The first particles X and the second particles Y are dispersed in a medium in the cell 10. The medium is a liquid such as water or a gas such as air.

Hereinafter, a description will be given of a case where the first particles X correspond to the measurement target X, such as medicine, food, or chemical industry products, and the second particles Y correspond to bubbles Y as particles which are not the measurement target.

The light irradiating device 20 irradiates the particle group accommodated in the cell 10 with light that spreads to a predetermined extent, and is of, for example, a surface emission type using a light emitting diode. Specifically, the light irradiating device 20 includes a light source 21 formed of a light emitting diode, and a transmission filter 22 that is provided on a light emission side of the light source 21 and that allows light having a predetermined wavelength to pass therethrough. The transmission filter 22 according to the present embodiment allows wavelengths (a first wavelength, a second wavelength, and a third wavelength) of light received by the image capturing device 30 to pass therethrough. To obtain a precise shadow picture, it is desired to irradiate the particle group with parallel light by using parallel illumination. Although telecentric illumination is optimum, a combination of an LED light source and a condenser lens L may be used.

The image capturing device 30 includes an image capturing lens 31 and an image capturing element 32 that receives light focused by the image capturing lens 31.

The image capturing lens 31 has a focus plane in the cell 10 that accommodates the particle group. The image capturing lens 31 according to the present embodiment uses a telecentric lens. Use of the telecentric lens makes it possible to capture an image having no distortion without affected by parallax.

Figure 2:
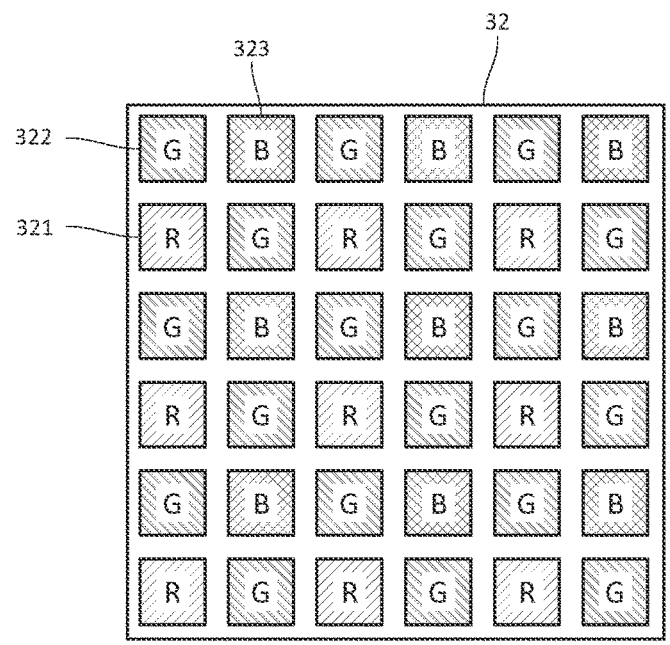
FIG. 2 is a diagram schematically illustrating an example configuration of an image capturing element according to the embodiment.

As illustrated in FIG. 2, the image capturing element 32 includes a plurality of first light receiving elements 321 that receive light in a first wavelength range, a plurality of second light receiving elements 322 that receive light in a second wavelength range, and a plurality of third light receiving elements 323 that receive light in a third wavelength range. In the present embodiment, the light in the first wavelength range is red light (R), the light in the second wavelength range is green light (G), and the light in the third wavelength range is blue light (B). The plurality of first to third light receiving elements 321, 322, and 323 according to the present embodiment are arranged in a matrix on a single substrate. In front of each of the light receiving elements 321, 322, and 323 in the image capturing element 32, a transmission filter (not illustrated) that allows light in the corresponding wavelength range to pass therethrough is provided. The above-described transmission filter 22 of the light irradiating device 20 is an RGB transmission filter that allows red light, green light, and blue light to pass therethrough.

Here, the image capturing element 32 has a spectral sensitivity in which the wavelength ranges of R, G, and B overlap each other. On the other hand, the transmission filter 22 of the light irradiating unit 2 has a spectral transmittance in which the wavelength ranges of R, G, and B are separated from each other. Thus, the transmission filter 22 causes the light in the first wavelength range (R) to have a center wavelength of 630 nm, the light in the second wavelength range (G) to have a center wavelength of 530 nm, and the light in the third wavelength range (B) to have a center wavelength of 460 nm, each wavelength range having a width. As the image capturing element 32, a three-CCD image sensor may be used.

Here, the image capturing device 30 according to the present embodiment includes an optical element 33 that generates an axial chromatic aberration between an image formation system of the first wavelength range, an image formation system of the second wavelength range, and an image formation system of the third wavelength range, as illustrated in FIG. 1.

The optical element 33 is a flat plate that is made of, for example, a high-dispersion glass material, and that is provided between the image capturing lens 31 and the individual light receiving elements 321, 322, and 323. As a high-dispersion glass material, a material having an Abbe number smaller than 30 can be used.

The optical element 33 causes the position of the focus plane of the image capturing lens 31 to be shifted in an optical axis direction. Specifically, as illustrated in FIG. 1, the position of the focus plane is shifted from an object side toward the image capturing lens 31, in the order of a focus plane F1 of the light in the first wavelength range (red light), a focus plane F2 of the light in the second wavelength range (green light), and a focus plane F3 of the light in the third wavelength range (blue light). Each of the focus planes F1, F2, and F3 has a depth of field of the image capturing lens 31.

As described above, the region where the first light receiving elements 321 capture an image (the focus plane F1), the region where the second light receiving elements 322 capture an image (the focus plane F2), and the region where the third light receiving elements 323 capture an image (the focus plane F3) are at positions different from each other along the optical axis direction. Here, edge portions in the optical axis direction of the regions (focus planes) adjacent to each other overlap each other. The focus planes do not necessarily need to precisely overlap each other, and portions in a width direction may overlap each other. The focus planes adjacent to each other may be separated from each other.

Individual pieces of image data obtained by the light receiving elements 321, 322, and 323 are subjected to analysis processing performed by the image analyzing device 40.

The image analyzing device 40 is a general-purpose or dedicated computer including a CPU, a memory, an input/output interface, an AD converter, input means such as a keyboard or a mouse, and so forth.

Figure 3:
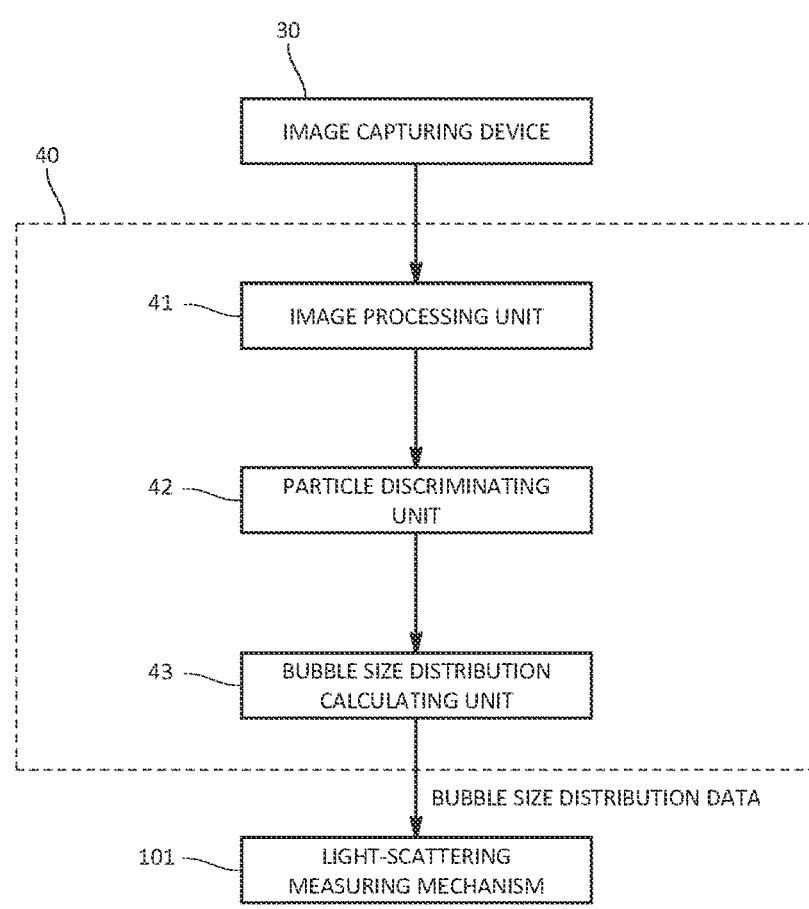
FIG. 3 is a functional block diagram illustrating the functions of an image analyzing device according to the embodiment.

The image analyzing device 40 has functions such as an image processing unit 41, a particle discriminating unit 42, and a bubble size distribution calculating unit 43 as illustrated in FIG. 3, the functions being implemented when the CPU and the peripheral device thereof operate on the basis of a program stored in the memory.

Figure 4:
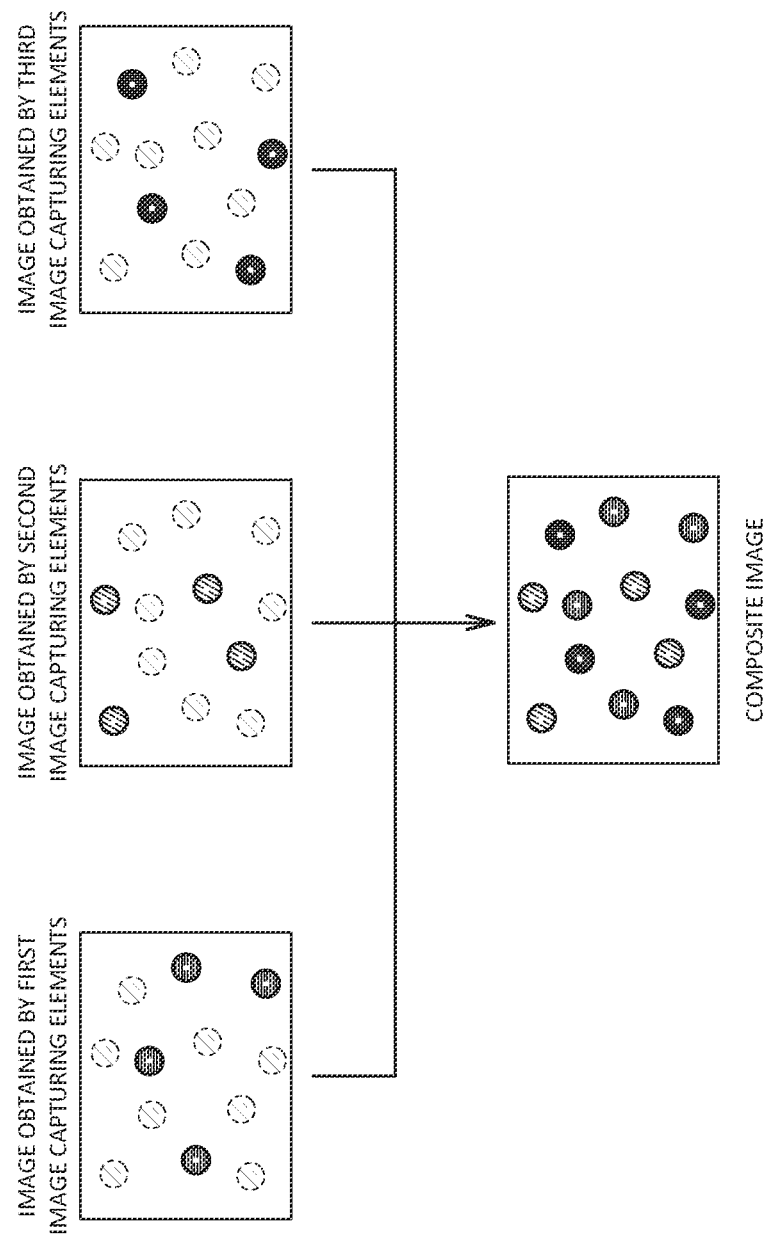
FIG. 4 is a diagram illustrating focus stacking according to the embodiment.

As illustrated in FIG. 4, the image processing unit 41 performs image processing such as focus stacking by using a first image obtained by the first light receiving elements 321, a second image obtained by the second light receiving elements 322, and a third image obtained by the third light receiving elements 323, and combines the images into one image. More specifically, the image processing unit 41 forms the first to third images without performing Bayer conversion on light intensity signals obtained by the individual light receiving elements 321 to 323. Subsequently, the image processing unit 41 compensates for, for each of the first image, the second image, and the third image, lack of pixels outside the corresponding wavelength range. After that, the image processing unit 41 performs focus stacking by using the compensated images and combines the images into one image. Note that the image processing unit 41 does not necessarily need to combine the images. Alternatively, the image processing unit 41 may form the first to third images after performing Bayer conversion on the light intensity signals obtained by the individual light receiving elements 321 to 323.

Figure 5:
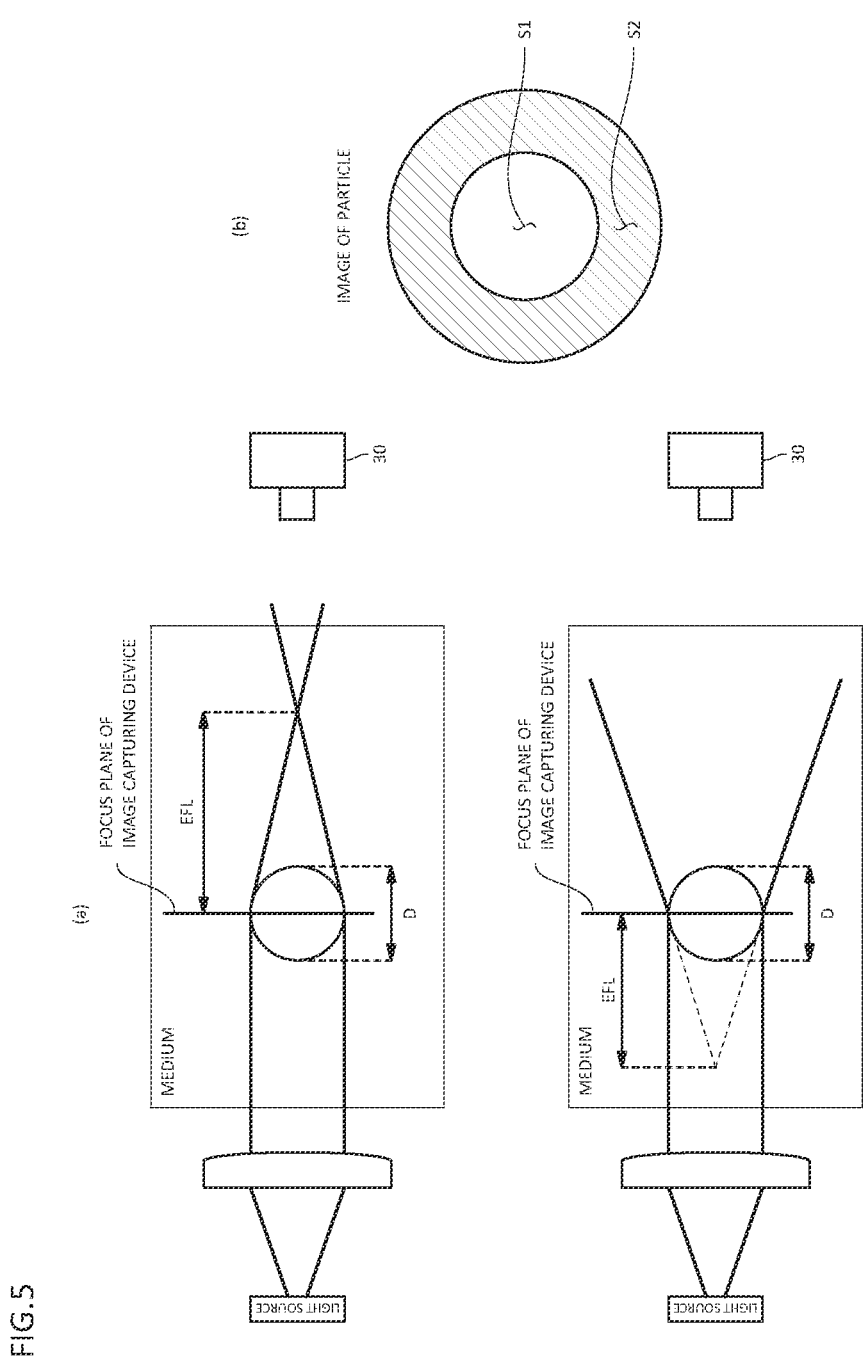
FIG. 5 includes diagrams for describing the function of a particle discriminating unit according to the embodiment.

Here, the light irradiating device 20 and the image capturing device 30 are disposed so as to face each other with the cell 10 interposed therebetween. Light emitted by the light irradiating device 20 is refracted when passing through a translucent particle, as illustrated in FIG. 5(*a*). More specifically, in a case where the refractive index of the particle is greater than the refractive index of the medium, the light is refracted to condense, as illustrated in the upper part of the figure. In a case where the refractive index of the particle is smaller than the refractive index of the medium, the light is refracted to disperse, as illustrated in the lower part of the figure. Accordingly, part of light radiated to the particle, specifically, the light radiated to a center portion of the particle, reaches the image capturing device 30.

As a result, an image of the particle captured by the image capturing device 30 has light and dark regions resulting from the refraction of the light passing through the particle, as illustrated in FIG. 5(*b*). More specifically, the center portion of the particle depicted in the image is a light region (hereinafter referred to as a light region S1), and the peripheral portion thereof is a dark region (hereinafter referred to as a dark region S2). The light region S1 and the dark region S2 are identifiable regions.

In more detail, as illustrated in FIG. 5(*a*), in a case where a particle as the measurement target X and the bubble Y are regarded as ball lenses, a focal length EFL of each of these particles can be calculated by using the following equation, in which a diameter D of the particle, a refractive index n1 of the particle, and a refractive index n2 of the medium in which the particle disperses are parameters.

$$EFL = n1 \cdot D/4(n1-n2)$$

From the above, if an image of the measurement target X and the bubble Y whose diameters D are equal to each other is captured, the ratios, sizes, shapes, brightnesses (contrast), or the like of the light region S1 and the dark region S2 change as a result of the difference between the refractive index of the measurement target X and the refractive index of the bubble Y.

Thus, the particle discriminating unit 42 discriminates whether a particle depicted in an image obtained by the image processing unit 41 is the first particle or the second particle, that is, the measurement target X or the bubble Y, on the basis of the above-described light region S1 and dark region S2. Specifically, the particle discriminating unit 42 is configured to discriminate whether a particle depicted in an image is the measurement target X or the bubble Y on the basis of an image difference in the light region S1 and the dark region S2, the image difference arising from the difference between the refractive index of the measurement target X and the refractive index of the bubble Y, and calculate the image difference by, for example, binarizing the image.

The particle discriminating unit 42 according to the present embodiment is configured to use the ratio of the light region S1 to the particle depicted in the image as the above-described image difference and discriminate whether the particle is the measurement target X or the bubble Y on the basis of the ratio. More specifically, the particle discriminating unit 42 is configured to discriminate whether the particle is the measurement target X or the bubble Y on the basis of the ratio of the outer diameter of the light region S1 to the outer diameter of the particle depicted in the image or the ratio of the area of the light region S1 to the area of the particle depicted in the image. The particle discriminating unit 42 determines that the particle is the bubble Y if the above-described ratio is lower than a predetermined threshold value, and determines that the particle is the measurement target X if the above-described ratio is higher than or equal to the predetermined threshold value.

The threshold value is variable according to various factors, for example, the shape or size of the cell 10, the disposition of the light irradiating device 20, the optical system of the image capturing device 30, the relative magnitudes of the refractive index of the medium and the refractive index of the particle, and so forth. Thus, the threshold value can be determined on the basis of the ratio of a light region to a bubble depicted in an image that is obtained by accommodating bubbles generated by, for example, a bubble generator or the like, in the cell 10 according to the present embodiment and capturing an image of these bubbles by using the light irradiating device 20 and the image capturing device 30 according to the present embodiment. The threshold value determined in this manner is stored in the memory of the image analyzing device 40, and therefore the particle discriminating unit 42 is capable of obtaining the threshold value from the memory and discriminating a particle.

The bubble size distribution calculating unit 43 calculates the particle size distribution of the bubbles Y accommodated in the cell 10 (hereinafter referred to as a bubble size distribution) on the basis of the image data received by the above-described image processing unit 41 and a result of discrimination performed by the particle discriminating unit 42. Specifically, the bubble size distribution calculating unit 43 calculates, for each of particles determined to be the bubbles Y by the particle discriminating unit 42, the outer diameter from the image data thereof to calculate a bubble size distribution.

Figure 6:
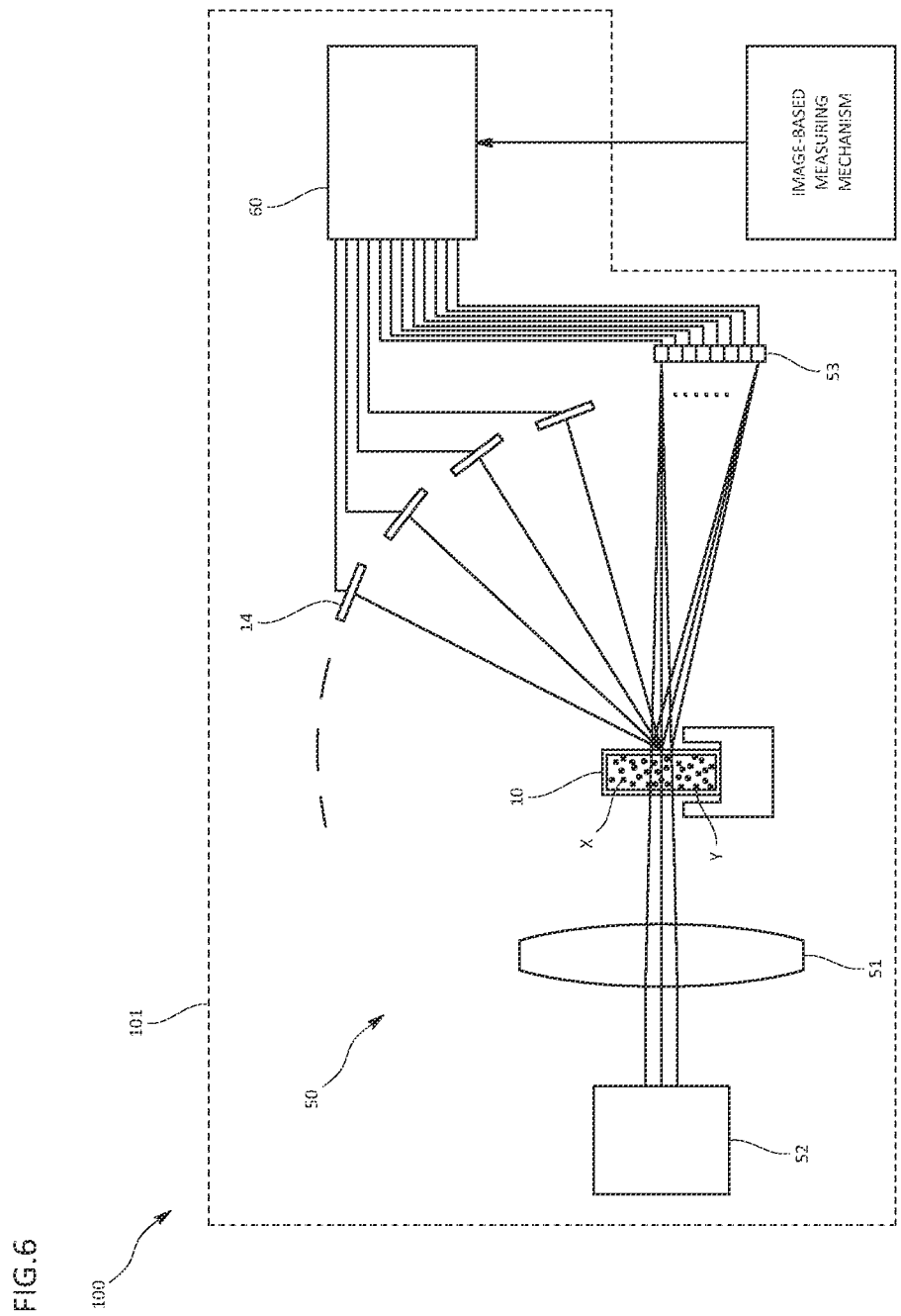
FIG. 6 is a diagram schematically illustrating an overall configuration of a light-scattering measuring mechanism according to the embodiment.

Here, the particle size distribution measuring device 100 according to the present embodiment further includes a light-scattering measuring mechanism 101 that obtains bubble size distribution data indicating the bubble size distribution measured by the above-described image-based measuring mechanism and that measures the particle size distribution of the measurement target X, as illustrated in FIG. 6.

The light-scattering measuring mechanism 101 measures a particle size distribution by using that a light intensity distribution based on the spread angle of diffracted/scattered light generated when a particle is irradiated with light is determined by the particle size on the basis of the diffraction theory and the MIE scattering theory, and by detecting the diffracted/scattered light, and includes a device main body 50 and a computing device 60.

The device main body 50 includes a laser device serving as a light source 52 that irradiates the particle group in the cell 10 with laser light via a lens 51, and a plurality of photodetectors 53 that detect the intensity of diffracted/scattered light generated by irradiation with the laser light in accordance with the spread angle. The cell 10 herein is a batch cell, and may be a circulation cell. Preferably, the cell 10 is identical to the one used in the measurement performed by the above-described image-based measuring mechanism. As described above, the cell 10 accommodates not only the measurement target X but also the bubbles Y.

Figure 7:
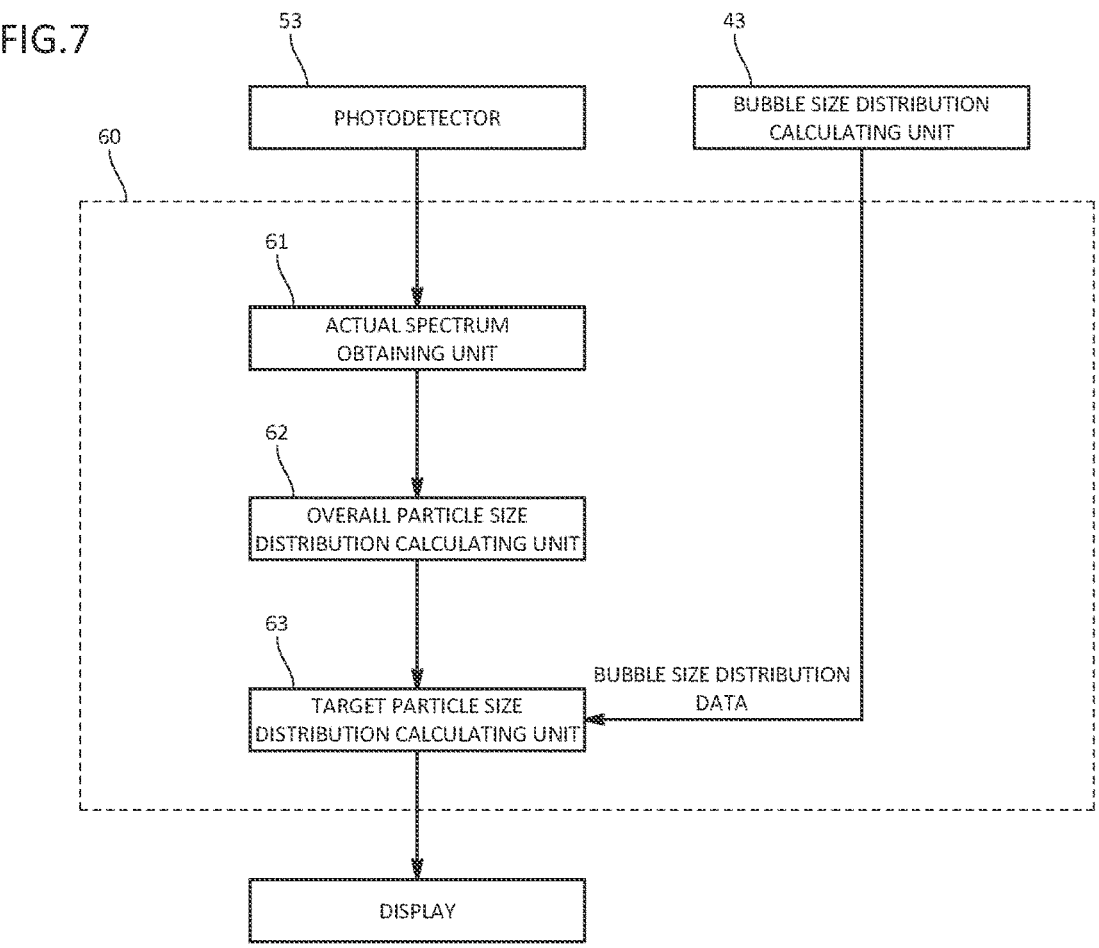
FIG. 7 is a functional block diagram illustrating the functions of a computing device according to the embodiment.

The computing device 60 is, from a physical point of view, a general-purpose or dedicated computer including a CPU, a memory, an input/output interface, and so forth, and has functions such as an actual spectrum obtaining unit 61, an overall particle size distribution calculating unit 62, and a target particle size distribution calculating unit 63 as illustrated in FIG. 7, the functions being implemented when the CPU and the peripheral device thereof operate in cooperation with each other in accordance with a predetermined program stored in a predetermined region of the memory.

The actual spectrum obtaining unit 61 receives light intensity signals output from the individual photodetectors 53 and obtains a light intensity spectrum corresponding to the channels of the individual photodetectors 53, that is, a light intensity spectrum corresponding to the spread angle of diffracted/scattered light (hereinafter referred to as an actual spectrum). The actual spectrum herein includes the light intensity spectrum of diffracted/scattered light resulting from a particle group which is the measurement target X and the light intensity spectrum of diffracted/scattered light resulting from bubbles, both the spectra overlapping each other.

The overall particle size distribution calculating unit 62 calculates, on the basis of the actual spectrum obtained by the actual spectrum obtaining unit 61, the particle size distribution of the overall particle group accommodated in the cell 10, that is, the particle group including not only the particle group which is the measurement target X but also bubbles which are not the measurement target (hereinafter referred to as an overall particle size distribution).

The target particle size distribution calculating unit 63 receives bubble size distribution data indicating the bubble size distribution calculated by the above-described bubble size distribution calculating unit 43 and subtracts an influence of the bubble size distribution from the overall particle size distribution to calculate a target particle size distribution, which is the particle size distribution of the measurement target X.

Figure 8:
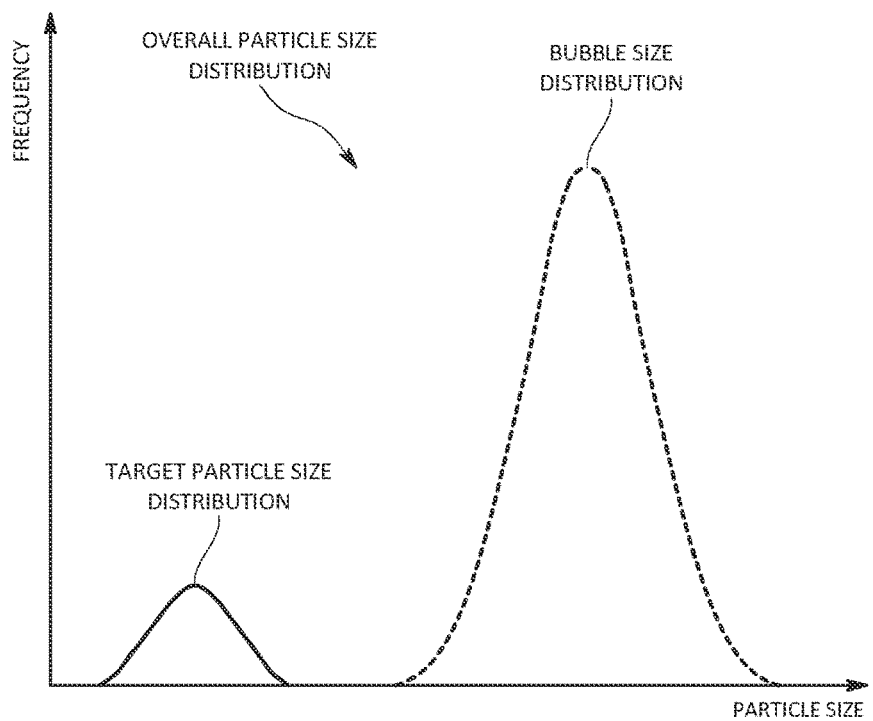
FIG. 8 is a diagram for describing the function of a target particle size distribution calculating unit according to the embodiment.

Specifically, the target particle size distribution calculating unit 63 subtracts the region of the bubble size distribution from the overall particle size distribution to calculate the target particle size distribution and displays the target particle size distribution on, for example, a display or the like, as illustrated in FIG. 8. As a specific display manner, the target particle size distribution may be displayed on a graph in which one axis represents particle size and the other axis represents frequency (percentage). Only the target particle size distribution may be displayed, or the target particle size distribution and the bubble size distribution may be displayed in an identifiable manner as illustrated in FIG. 8.

Alternatively, the target particle size distribution may be calculated by subtracting a result obtained by, for example, weighting the region of the bubble size distribution from the overall particle size distribution, instead of subtracting the region of the bubble size distribution as is from the overall particle size distribution.

The particle size distribution measuring device 100 having this configuration measures a bubble size distribution, which is the particle size distribution of the bubbles Y in the cell 10, by using the image-based measuring mechanism, and subtracts the bubble size distribution from an overall particle size distribution to calculate a target particle size distribution, and is thus capable of reducing a measurement error caused by the bubbles Y and accurately measuring the target particle size distribution.

In addition, particles at positions different in the optical axis direction of the image capturing lens 31 can be measured by receiving, with the first to third light receiving elements 321, 322, and 323, light in the first wavelength range, light in the second wavelength range, and light in the third wavelength range each of which has an axial chromatic aberration generated by the optical element 33. In other words, more particles can be focused on and more particles can be discriminated between the measurement target X and the bubble Y. As a result, the particle size distribution of the bubbles Y included in the particle group can be accurately calculated, and thus the particle size distribution of the particle group which is the measurement target X (the target particle size distribution) can be accurately measured.

The present invention is not limited to the foregoing individual embodiments.

For example, in the foregoing embodiment, a particle is discriminated on the basis of an image difference which is the ratio of the light region S1 to the particle depicted in an image. Alternatively, a particle may be discriminated on the basis of an image difference which is the size or brightness of the light region S1.

In the case of using the size of the light region S1 as an image difference, it is sufficient that the particle discriminating unit 42 be configured to discriminate a particle by comparing the size of the light region S1 with a threshold value set in advance, as in the foregoing embodiment.

In the case of using the brightness of the light region S1 as an image difference, it is sufficient that the particle discriminating unit 42 be configured to discriminate a particle by comparing the contrast of the light region S1 (for example, the difference between the brightness of the medium and the brightness of the light region S1 depicted in an image) with a threshold value set in advance.

In the image-based measuring mechanism, the light irradiating device may be configured to irradiate a particle group with parallel light similar to that of the foregoing embodiment and irradiate the particle group with slanting light having an optical axis slanting with respect to the optical axis of the parallel light, and the particle discriminating unit may discriminate whether a particle is the measurement target X or the bubble Y by using, as an image difference, at least one of the ratio, size, shape, disposition, or brightness of a light region that appears as a result of refraction of the slanting light passing through the particle (hereinafter also referred to as a second light region S3).

A more specific example is a configuration of irradiating a particle group with, for example, ring-shaped light, from a direction slanting with respect to parallel light, as illustrated in FIG. 9(*a*).

With this configuration, the second light region S3 is larger than the light region S1 as illustrated in FIG. 9(*b*), and thus the particle can be discriminated by using the second light region S3 even when, for example, the particle is located out of focus of the image capturing device 30 and the second light region S3 blurs to some extent. Accordingly, more particles can be discriminated between the measurement target X and the bubble Y. Thus, the particle size distribution of the bubbles Y can be accurately calculated, and thus the particle size distribution of the measurement target X can be accurately calculated.

Another example is a configuration of irradiating a particle group with a plurality of slanting light beams from directions different from each other, as illustrated in FIG. 10(*a*). Here, the particle group is irradiated with two slanting light beams from directions different from each other and slanting with respect to parallel light. The slanting light beams herein are light beams of colors different from each other (for example, blue light and red light).

With this configuration, an image of second light regions S3 the number of which is the same as the number of slanting light beams can be captured as illustrated in FIG. 10(*b*), more parameters such as the ratios, sizes, shapes, and dispositions of these second light regions S3 can be used as an image difference, and whether the particle is the measurement target X or the bubble Y can be discriminated more correctly. In addition, because the plurality of slanting light beams have colors different from each other, the ratio, size, shape, disposition, brightness, or the like of the second light region S3 for each slanting light beam can be correctly identified.

In the case of using the ratio, size, or brightness of the second light region S3 as an image difference, it is sufficient that the particle discriminating unit 42 be configured to discriminate a particle by comparing the ratio or size with a threshold value set in advance, as in the foregoing embodiment.

In the case of using the shape or disposition of the second light region S3 as an image difference, association data may be stored in advance in an association data storage unit that is set in a predetermined region of the memory of the image analyzing device 40. The association data includes, for example, type information of a particle indicating whether the particle is a measurement target or a bubble, and a reference pattern indicating the reference shape or reference disposition of the second light region S3 predetermined for each type of particle, which are associated with each other. It is sufficient that the particle discriminating unit 42 be configured to compare an actual pattern indicating the actual shape or actual disposition of the second light region S3 of a particle depicted in a captured image with the reference pattern stored as the association data, and determine the type information of the particle associated with the reference pattern closest to the actual pattern.

Furthermore, as illustrated in FIG. 10(*a*), parallel light and slanting light may have colors different from each other, and the parallel light and the slanting light may be caused to pass through a color filter (not illustrated), such as an RGB filter, so as to be led to the image capturing element of the image capturing device 30.

With this configuration, the color filter makes it possible to separately identify the light region S1 that appears as a result of the parallel light and the second light region S3 that appears as a result of the slanting light and to reduce loss of pixels.

In addition, the particle discriminating unit may discriminate a particle on the basis of the ratio, size, shape, disposition, or the like of the dark region S2, instead of discriminating a particle on the basis of the ratio or the like of the light region S1 as described above.

Furthermore, the particle discriminating unit may compare the light and dark regions of a particle depicted in an image obtained by receiving light having the first wavelength by the first light receiving elements with the light and dark regions of a particle depicted in an image obtained by receiving light having the second wavelength by the second light receiving elements, and may discriminate the particles on the basis of the comparison result. Obviously, the light and dark regions of a particle depicted in an image obtained by receiving light having the third wavelength by the third light receiving elements may further be used as a comparison target.

In addition, although a target particle size distribution is calculated by subtracting a bubble size distribution from an overall particle size distribution in the foregoing embodiment, a bubble spectrum, which is the light intensity spectrum of diffracted/scattered light resulting from bubbles, may be calculated from the bubble size distribution, the bubble spectrum may be subtracted from an actual spectrum to calculate a target spectrum, which is the light intensity spectrum of diffracted/scattered light resulting from the measurement target X, and a target particle size distribution may be calculated on the basis of the target spectrum.

Furthermore, although light in the three wavelength ranges of RGB is used in the foregoing embodiment, other wavelength ranges different from each other may be used to perform measurement. Instead of the three wavelength ranges, two wavelength ranges may be used to perform measurement, or four or more wavelength ranges may be used to perform measurement. Furthermore, in the case of not using the optical element 33 that generates an axial chromatic aberration described in the foregoing embodiment, the light irradiating device 20 may emit light having a single wavelength.

The optical element according to the foregoing individual embodiments may be made of resin having a transmittance and an Abbe number of about 30, such as polycarbonate (PC) or polystyrene (PS), instead of a glass material.

In addition, although an overall particle size distribution is measured by the light-scattering measuring mechanism 101 in the foregoing embodiment, an overall particle size distribution may be measured by the image-based measuring mechanism.

Although the first particle is a translucent measurement target and the second particle is a bubble in the foregoing embodiment, the first particle may be a bubble which is a measurement target and the second particle may be a particle which is not a measurement target and which is different from the bubble.

Alternatively, the first particle may be a translucent particle which is not a measurement target and the second particle may be a measurement target which is not translucent, for example.

As long as the first particle is a translucent particle and the second particle is a particle which is not translucent, the particle discriminating unit may discriminate a particle on the basis of whether the particle depicted in an image has light and dark regions, that is, on the basis of the presence or absence of light and dark regions, regardless of which particle is used as a measurement target.

One or some of the functions of the foregoing embodiment may be executed by a machine learning unit that performs arithmetic processing by using a machine learning algorithm. For example, the function of the particle discriminating unit 42 may be executed by the machine learning unit. The machine learning unit performs machine learning by using a plurality of images obtained in advance, and discriminates whether the particle is the measurement target X or the bubble Y (a non-target particle) by using a result of the machine learning. Part of an image including the particle to be discriminated may be cut out from an image obtained by the image processing unit 41, and the machine learning unit may be caused to receive the part of the image as an input.

The light-scattering measuring mechanism 101 according to the foregoing embodiment measures a particle size distribution by using that a light intensity distribution based on the spread angle of diffracted/scattered light generated when a particle is irradiated with light is determined by the particle size on the basis of the MIE scattering theory. Alternatively, the light-scattering measuring mechanism 101 may calculate a particle size distribution on the basis of the dynamic scattering theory, that is, calculate a particle size distribution on the basis of fluctuation of the light intensity detected by the photodetectors 53.

In addition, modifications or combinations of various embodiments may be made without deviating from the gist of the present invention.

REFERENCE SIGNS LIST 100 particle size distribution measuring device
10 cell
20 light irradiating device
30 image capturing device
40 image analyzing device
41 image processing unit
42 particle discriminating unit
43 bubble size distribution calculating unit
101 light-scattering measuring mechanism
50 device main body
60 computing device
61 actual spectrum obtaining unit
62 overall particle size distribution calculating unit
63 target particle size distribution calculating unit
X measurement target
Y bubble

INDUSTRIAL APPLICABILITY

According to the present invention, the particle size distribution of a measurement target can be accurately measured regardless of the presence of a particle which is similar in shape to the measurement target and which is not the measurement target.

The invention claimed is:

1. A particle size distribution measuring device comprising:
a light irradiating device including a light source that irradiates a particle group;
an image capturing device including a first component and an image sensor that captures an image of the particle group; and
a first hardware processor that receives image data of the image of the particle group from the image capturing device,
wherein the light irradiating device and the first component of the image capturing device are arranged on opposing sides of the particle group such that light passes from the light irradiating device through translucent particles in the particle group before reaching the first component of the image capturing device, the light reaching the first component being directed to the image sensor, and depictions of the translucent particles in the image each have light and dark regions resulting from refraction of the light passing through the translucent particles, and the first hardware processor is configured to determine a difference in light and dark regions in a depiction of a particle depicted in the image, the light and dark regions being a result of refraction of light passing through the particle, and to discriminate whether the particle depicted in the image is a first translucent particle or a second translucent particle based on the difference in the light and dark regions that appear in the depiction of the particle in the image.

2. The particle size distribution measuring device according to claim 1, wherein the first translucent particle is a measurement target and the second translucent particle is a bubble.

3. The particle size distribution measuring device according to claim 1, further comprising a second hardware processor that calculates an overall particle size distribution which is a particle size distribution of the particle group;
wherein the first translucent particle is a measurement target,
the first hardware processor calculates a second translucent particle distribution which is a particle size distribution of the second translucent particle on the basis of the image data received and a result of the discrimination, and
the second hardware processor subtracts an influence of the second translucent particle distribution from the overall particle size distribution to calculate a target particle size distribution which is a particle size distribution of the measurement target.

4. The particle size distribution measuring device according to claim 3, wherein the second hardware processor calculates the overall particle size distribution on the basis of a light intensity spectrum of diffracted/scattered light generated by irradiating the particle group with light.

5. The particle size distribution measuring device according to claim 2, wherein the first hardware processor discriminates whether the particle depicted in the image captured by the image capturing device is a bubble or the measurement target by using, as the image difference, at least one of a ratio, a size, a shape, a disposition, or a brightness of a light region of the light and dark regions or at least one of a ratio, a size, a shape, a disposition, or a brightness of a dark region of the light and dark regions.

6. The particle size distribution measuring device according to claim 5, wherein the image capturing device includes an image capturing lens,
the light receiving elements of the image capturing device include a first light receiving element that receives light in a first wavelength range of light focused by the image capturing lens and a second light receiving element that receives light in a second wavelength range of the light focused by the image capturing lens, and
the image capturing device further includes an optical element that expands an axial chromatic aberration between an image formation system of the first wavelength range and an image formation system of the second wavelength range.

7. The particle size distribution measuring device according to claim 5, wherein
the light irradiating device is configured to irradiate the particle group with parallel light and further irradiate the particle group with slanting light having an optical axis slanting with respect to an optical axis of the parallel light, and
the first hardware processor discriminates whether the particle depicted in the image captured by the image capturing device is a bubble or the measurement target on the basis of at least one of a ratio, a size, a shape, a disposition, or a brightness of a light region of light and dark regions that appear as a result of refraction of the slanting light passing through the particle or at least one of a ratio, a size, a shape, a disposition, or a brightness of a dark region of the light and dark regions.

8. The particle size distribution measuring device according to claim 7, wherein the slanting light is ring-shaped light.

9. The particle size distribution measuring device according to claim 7, wherein the light irradiating device is configured to irradiate the particle group with a plurality of slanting light beams having colors different from each other from directions different from each other.

10. A non-transitory computer-readable storage medium storing a program for a particle size distribution measuring device, the program causing a computer to execute the steps of:
receiving, from an image capturing device that captures light on an opposite side of a particle group from a light source, image data such that light from the light source passes through translucent particles in the particle group before reaching the image capturing device, and depictions of the translucent particles in the image have light and dark regions resulting from refraction of the light passing through the translucent particles;
determining a difference in light and dark regions in a depiction of a particle depicted in the image, the light and dark regions being a result of refraction of light passing through the particle; and
discriminating whether the particle depicted in the image is a first translucent particle or a second translucent particle based on the difference in the light and dark regions that appear in the depiction of the particle in the image.

11. A particle size distribution measuring device comprising:
a light irradiating device including a light source that irradiates a particle group;
an image capturing device including a first component and an image sensor that captures an image of the particle group;
a first hardware processor that receives image data of the image of the particle group from the image capturing device; and
a second hardware processor that calculates an overall particle size distribution which is a particle size distribution of the particle group, wherein
the light irradiating device and the first component of the image capturing device are arranged on opposing sides of the particle group such that light passes from the light irradiating device through translucent particles in the particle group before reaching the first component of the image capturing device, the light reaching the first component being directed to the image sensor, and the translucent particles in the image each have light and dark regions resulting from refraction of the light passing through the translucent particles,
the first hardware processor is configured to discriminate whether a particle depicted in the image is a first translucent particle or a second translucent particle, the first translucent particle being a type different from that of the second translucent particle, on the basis of a difference in light and dark regions that appear in the image as a result of refraction of light passing through the particle, the difference in the image arising from a difference between a refractive index of the first translucent particle and a refractive index of the second translucent particle, the first translucent particle is a measurement target;

the first hardware processor calculates a second translucent particle distribution which is a particle size distribution of the second translucent particle on the basis of the image data received and a result of the discrimination, and the second hardware processor subtracts an influence of the second translucent particle distribution from the overall particle size distribution to calculate a target particle size distribution which is a particle size distribution of the measurement target.

* * * * *